United States Patent [19]

Inoue et al.

[11] 3,963,937
[45] June 15, 1976

[54] INFORMATION SEARCHING DEVICE

[75] Inventors: Mutsuhiro Inoue, Sagamihara; Akira Konno, Tokyo; Yukio Izaka, Inagi, all of Japan

[73] Assignee: Canon Kabushiki Kaisha, Tokyo, Japan

[22] Filed: Aug. 26, 1974

[21] Appl. No.: 500,394

[30] Foreign Application Priority Data

Aug. 29, 1973 Japan.............................. 48-97087

[52] U.S. Cl................................ 250/548; 250/570; 353/26 A
[51] Int. Cl.²......................................... G01N 21/30
[58] Field of Search ........... 250/548, 559, 561, 570, 250/571; 352/92; 353/25, 26; 226/45, 43, 48

[56] References Cited
UNITED STATES PATENTS

| | | | |
|---|---|---|---|
| 3,435,243 | 3/1969 | Webb.................... | 250/561 |
| 3,443,108 | 5/1969 | Burmeister............ | 250/548 |
| 3,564,209 | 2/1971 | Loughnane............ | 353/26 |
| 3,643,098 | 2/1972 | Willits.................. | 250/548 |
| 3,700,320 | 10/1972 | Brewer et al. ........ | 226/43 |
| 3,768,897 | 10/1973 | Spani.................... | 353/26 |
| 3,802,771 | 4/1974 | Mickelson............. | 353/26 |
| 3,820,884 | 6/1974 | Sone et al............. | 250/570 |
| 3,849,660 | 11/1974 | Hommerin............ | 250/570 |

*Primary Examiner*—Alfred E. Smith
*Assistant Examiner*—D. C. Nelms
*Attorney, Agent, or Firm*—Fitzpatrick, Cella, Harper & Scinto

[57] ABSTRACT

An automatic information searching arrangement for searching desired image information from a record web having image information and searching marks placed thereon. The present invention provides scanning device which incorporates therein a light source and an image pickup tube or a flying spot cathode-ray tube and a photoelectric converter to convert it into an electric signal in time series. The blip zone in the record web is projected by the scanning device to convert it into an electric signal in time series whereby a desired information frame may automatically be searched. The information searching device comprises a unit for feeding a record web, a unit for scanning searching marks, a unit for forming one count signal from a plurality of mark signals generated from the scanning unit, and a control unit for generating a signal for controlling the feed of the record web. The record web may accurately be positioned by the arrangement of the present invention.

30 Claims, 27 Drawing Figures

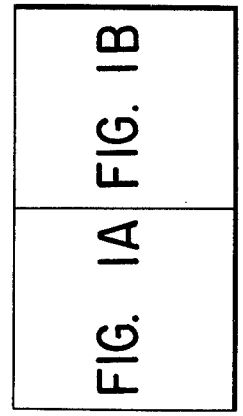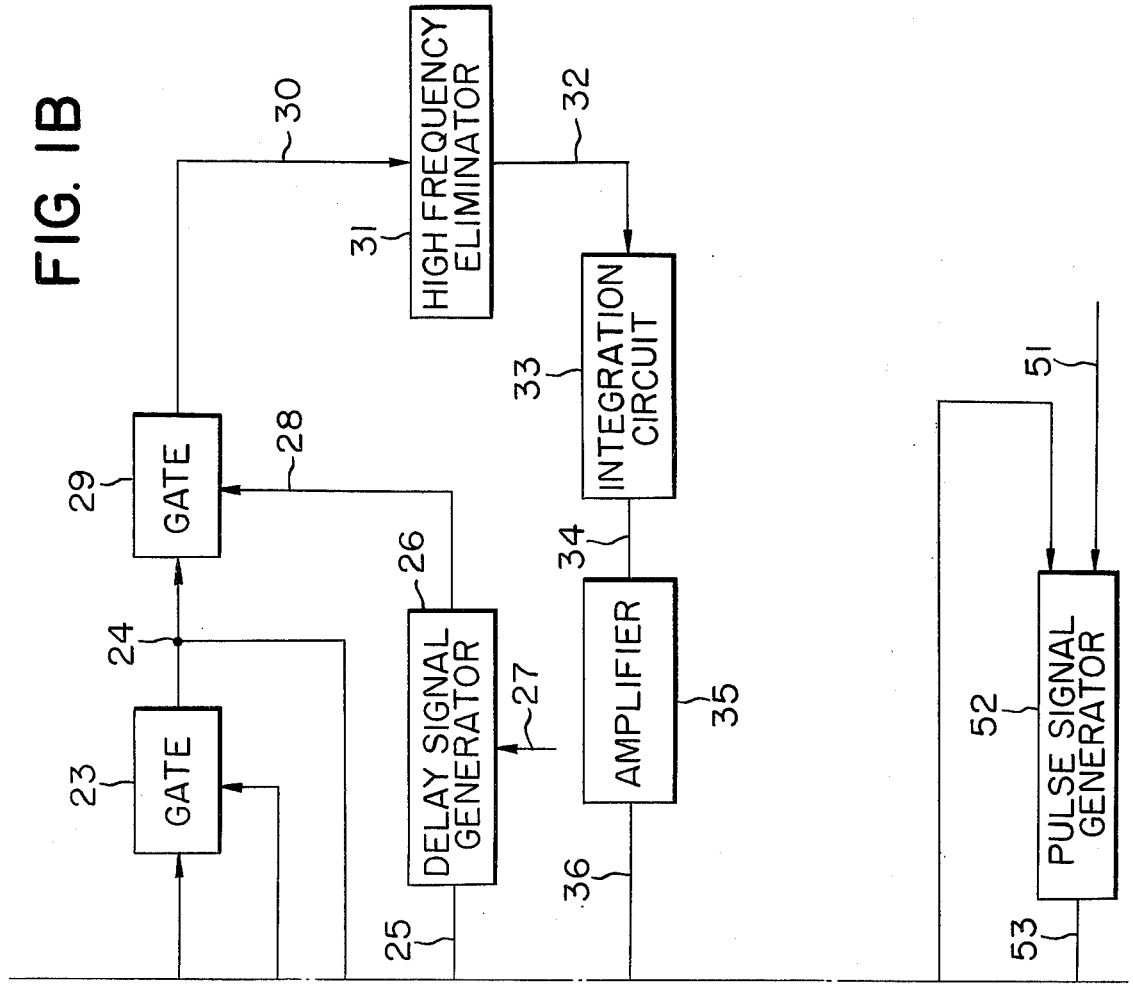

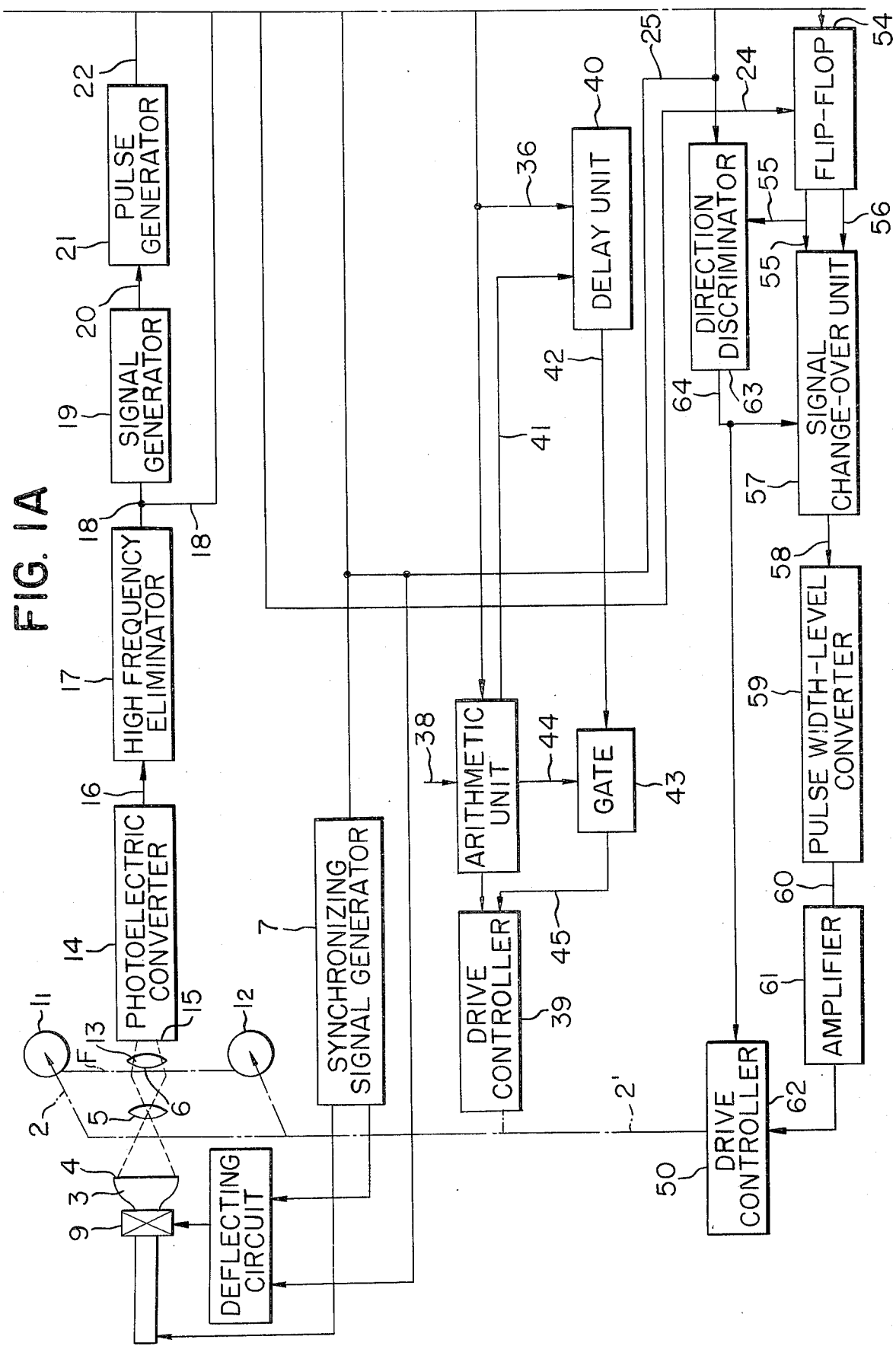

INFORMATION SEARCHING DEVICE

BACKGROUND OF THE INVENTION

1. Field of the Invention

The present invention relates to an information searching device for automatically searching desired image information from a record web having image information and a searching mark.

2. Description of the Prior Art

In order to search a desired frame from a roll of microfilm with a searching mark (hereinafter referred to as "blip") placed thereon, devices such as film reader or reader printer utilizing the blip and incorporating a search function therein have heretofore been used. Using this type of search system, the desired image frame is searched in such a manner that a microfilm with image film and blip corresponding to the image frame placed thereon is fed between a stationary light source and a photoelectric converter element, rays of light passed through the blip being detected by means of said photoelectric converter element, and electrical signals from the photoelectric converter element obtained by discontinuously exposing the photoelectric converter element with the light thus transmitted when the film is moved are counted by means of a counter, and then the value counted by the counter is compared with a frame number placed on the desired image.

Lately, an image transmission system has been utilized, wherein the image on the microfilm is scanned at a light spot to convert it into an electric signal corresponding to gradation of the image, and this electrical signal is transmitted to an indicating means located at a terminal through a transmission path to effect electric-to-optical conversion thereby reproducing the image for the reading or printing. However, since this image transmission system is to image and scan the image plane, the scanning mechanism thereof prevents the above-described searching system from being utilized. According to prior art searching systems, for the purpose of properly stopping the film in position after the blip corresponding to the desired frame has been counted, the position of stopping the film has been determined by the relative positional relationship between a slit made in an exposure light path from the stationary light source and the blip on the film, or by the relative positional relationship between a projected image of the blip projected through an optical system and the photoelectric converter element. In either case, therefore, the film position is mechanically determined. In the event that various forms of a film are used wherein the relative record position between the image frame and the blip is different, the film stop position will be changed. From this reason, the position of an image frame projected on a screen of a reader when the film is stopped changes with the form of film to cause the desired image to be displaced partially or completely from the screen, and as a result the desired image cannot be read properly from the screen at the same time when searching has been completed. In order to place the image in properly readable condition, an operator must adjust or move the film to correct the stop position thereof. The prior art system further possesses a disadvantage such that even if the same form of film is used, the stop position of film could not be changed as desired.

SUMMARY OF THE INVENTION

It is therefore an object of this invention to provide a novel information searching device applicalbe to an information transmission system, wherein information on a record web with image information and blip placed thereon is projected by a scanning device incorporating therein a light source and an image pickup tube or a flying spot cathode-ray tube and a photoelectric converter element to convert it into an electric signal in time series, and said electric signal is transmitted through a transmission path to an indicating means located at a terminal, said signal being subjected to electric-to-optical conversion to reproduce information for the reading or printing.

It is another object of this invention to provide an information searching device wherein a blip zone in the record web is projected by a scanning device to convert it into an electric signal in time series whereby a desired information frame may automatically be searched on the basis of said signal.

It is a further object of this invention to provide an information searching device which comprises means for feeding a record web, scanning means for repeatedly scanning a predetermined range of passage of blip in the direction of the record web movement to detect the blip and to generate a mark signal, means for forming one count signal from a plurality of mark signals generated from said scanning means while one blip passes through said scanning range, and control means for generating a signal for controlling the feed of the record web when said count signals are counted so that the counted value corresponds to a predetermined frame number.

It is still another object to provide a device which can accurately position the record web in a predetermined position.

The invention will become more apparent in the detailed description and embodiments taken in connection with the accompanying drawings, in which:

BRIEF DESCRIPTION OF THE DRAWINGS

FIGS. 1, 1 (A) and 1 (B) are a block diagram of one preferred form of a searching device according to the present invention;

DESCRIPTION OF PREFERRED EMBODIMENTS

Figure 2:
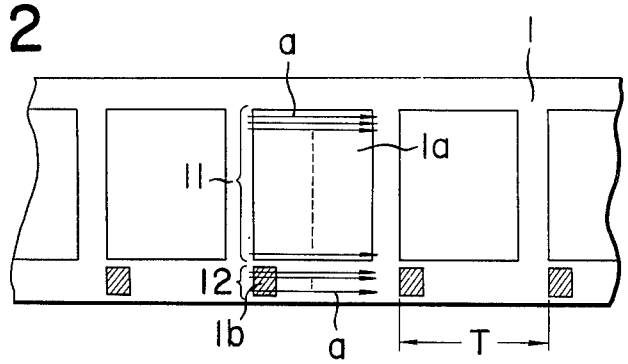
FIG. 2 is a view of assistance in explaining the scanning of a microfilm.

Referring now to FIG. 1, there is shown a roll of microfilm F with image frames and blips, each of which being placed on one side of each frame, recorded thereon, said microfilm being wound around a feed reel $1_1$ and a winding reel $1_2$ and passed therebetween. A reel shaft of each reel is connected to a film feed mechanism 2 of drive motor. The microfilm F is reciprocated up and down as viewed in the figure by means of the film feed mechanism. A flying spot scanner cathode-ray tube (hereinafter referred to as "CRT") 3 produces at its fluorescent surface 4 a scanning light spot having a constant brightness, said scanning light spot being focused on a microfilm surface 6 by means of an optical lens 5. In FIG. 1, the scanning light spot is waved from top to bottom or from bottom to top (corresponding to the direction of film movement) in a predetermined range where the blip on the microfilm passes, and is gradually moved backward from this side while repeating such operation. Namely, the scanning light spot is repeatedly scanned in a horizontal direction, in a predetermined range where the film passes, and is orderly moved in a vertical direction. In the event that an image frame is read out, the whole surface of a stationary image zone is uniformly scanned by the scanning spot in a state where the film is stopped. On the other hand, in the event that searching is carried out, a blip zone is scanned by the scanning light spot while the film is moved up or down by means of the feed mechanism 2. A deflecting coil 9 for CRT 3 deflects an electron beam of CRT 3 by means of a defecting signal from a deflecting circuit 8 which receives a vertical synchronizing signal and horizontal synchronizing signal from a synchronizing signal generator 7. Thus, at the time of reading the image frame and at the time of carrying out the searching, the deflecting signal is transmitted to the deflecting coil 9 from the deflecting circuit 8 to deflect the electron beam in a way that different zones on the film are scanned at the scanning light spot. Further, the CRT 3 receives a fly-back line erasing signal for erasing the scanning light spot during the period of fly-back from the synchronizing signal generator through a line 10.

FIG. 2 illustrates the scanning mode of a microfilm scanned by the scanning light spot. When an image frame 1a of the microfilm F is read (at the time when film is stopped), an image zone 11 is uniformly scanned by means of a horizontal scanning line (a). On the other hand, when the microfilm is searched (when film is transported), a zone 12 including a blip 1b is repeatedly scanned by means of a horizontal scanning line similar to the scanning line (a). During the time when the scanning light spot scans a predetermined range, the blip on the film passes through that scanning zone. It may of course be designed so that in scanning the blip zone, the same horizontal line can repeatedly be scanned instead of successively moving the horizontal scanning line in the vertical direction. The scanning direction of the scanning light spot may suitably be selected. However, it is assumed in the illustrated embodiment that the image portion and blip portion are scanned from left to right, gradually changing from top to bottom and after repetition of such operation they are scanned from left to right. In scanning respective zones on the film, the frequency of the scanning light spot which scans the image zone may separately be selected from that of the scanning light spot which scans the blip zone so that both the frequencies are different, but if is preferable that in the case of carrying out high velocity scanning with the scanning frequency of the image zone set to frequency of a standard television or analogous thereto, the scanning frequency of the blip zone is made the same as that described. It is further preferable that in the event that the image zone scanning velocity is extremely lower than that of the standard television or that analogous thereto, for example, at a low velocity more or less facsimile, the blip zone scanning velocity is made to have frequency of the standard television or high velocity scanning frequency analogous thereto.

In the image zone scanning, the fly-back line erasing of the scanning light spot during the period of fly-back may be performed in either method, that is, erasing both the horizontal and vertical directions, or erasing only one direction, while in the blip zone scanning, the fly-back line erasing in the horizontal direction is performed, but no fly-back line erasing in the vertical direction is performed.

In FIG. 1, the microfilm F is fed in reciprocating fashion by means of the feed mechanism, and in the illustrated embodiment, the film feed speed is controlled to be three speeds, that is, high, medium, and low according to a distance to the desired information frame. From this, the film feed speed at high level is less than one hundredth of the blip zone scanning speed, and the speed at low level is less than one ten thousandth.

Figure 3:
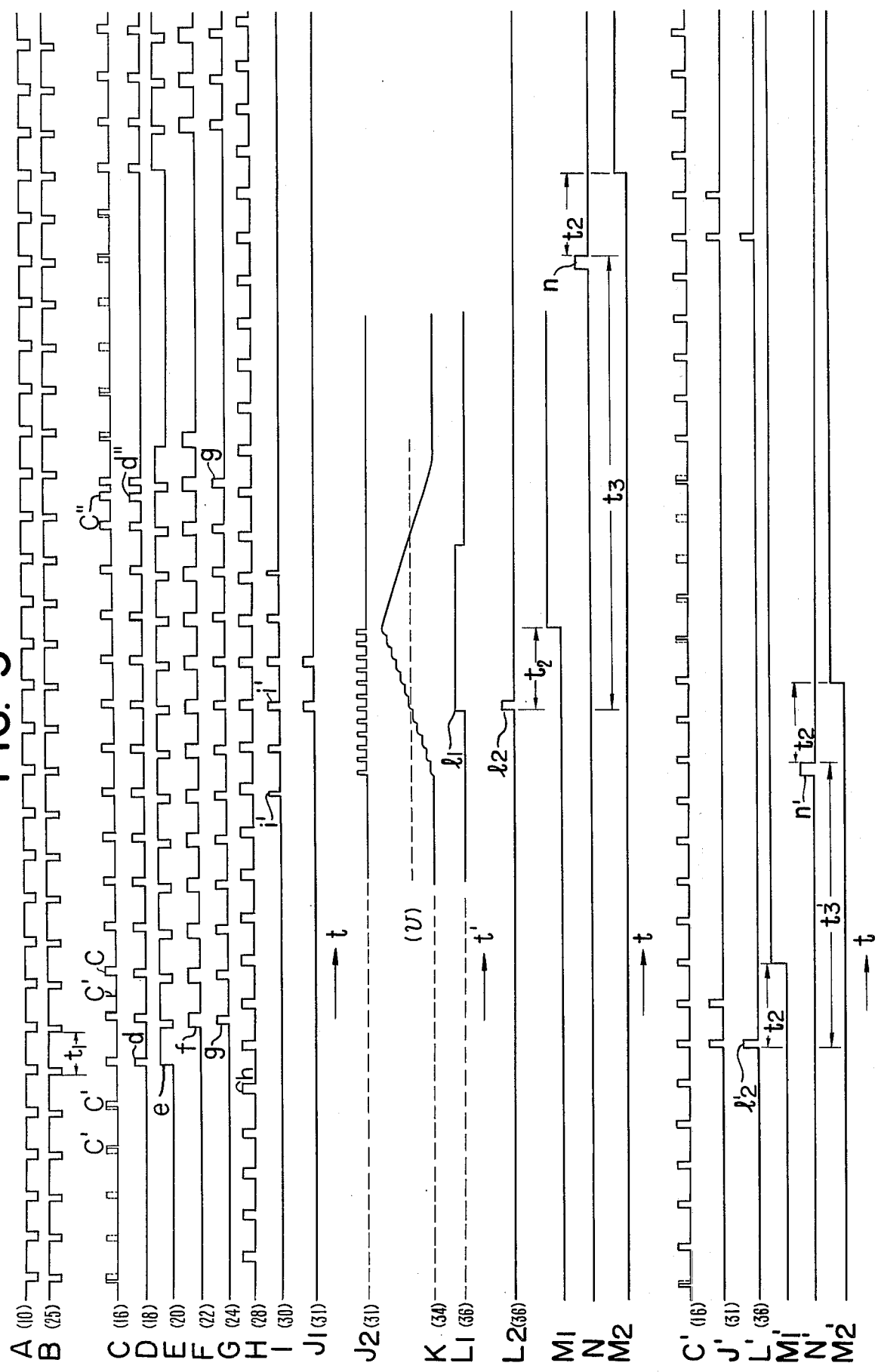
FIG. 3 shows signal waveforms on conductors in the searching device of FIG. 1.

FIG. 3 shows signal waveforms of output lines in respective portions of FIG. 1. For better understanding of explanation, the relationship between the film feed speed and the blip portion scanning speed is described so as to have the relationship between the film feed speed and the scanning speed on the ratio of less than one tenth. As previously mentioned, however, the film feed speed for practical use is relatively slow as compared with the scanning speed. In FIG. 3, waveform A designates a signal for erasing the scanning light spot during the period of fly-back in the horizontal scanning, showing a signal for erasing a fly-back line transmitted from the synchronizing signal generator 7 through the line 10. When the logic value of the fly-back line erasing signal is 1 (high level), the scanning light spot is produced, said scanning light spot causing the film F to be scanned from left to right as viewed in FIG. 2. When the logic value of the signal is 0 (0 level), the scanning light spot is not produced, providing the fly-back period. In manner as described above, the scanning light spot successively scans the blip zone on the film from top toward bottom, and after the lowermost line of the blip zone has been scanned, the scanning light spot again returns to the uppermost line of the blip zone and repeats similar scanning. It is noted that if no risk is involved to print film, only the blip zones on the uppermost line and intermediate line may be scanned from left to right.

Referring again to FIG. 1, the blip zone is successively scanned while the microfilm F is transported by the feed mechanism 2, and rays of light passed through the film are incident upon light receiving surface 15 of a photoelectric converter 14, which comprises a photoelectric amplifier or a photoelectric converter element, etc. through an optical lens 13.

The photoelectric converter 14 is provided to convert the light passed through the film into an electric signal and to provide a signal of waveform shown in FIG. 3(C) through a line 16. It is assumed that the film feed direction is determined to be the same direction as that of the scanning. The electric signal from the photoelectric converter 14 is transmitted to a high frequency eliminator 17, which eliminates a signal C' (waveform in FIG. 3(C)) shorter in time width than signals C detected from the front end to the rear end of the blip such as a signal produced due to minor stain, dirt or scratches present on the film or a signal produced when a part of blip moves outside the scanning range. Signal C'' is an error signal produced when big dirt or the like are detected from the blip, signal C'' not being eliminated by this eliminator. This high frequency eliminator 17 comprises a low pass filter, a time width - level converter and/or an amplifier for amplifying only the signal in excess of threshold. Output signals (d, d') (waveform shown in FIG. 3(D)) from the high frequency eliminator 17, by which the signal shorter in time width than the signal C due to the proper blip had been eliminated in a manner as hereinbefore described, are transmitted to a signal generator 19 through a line 18. In the waveform D of FIG. 3, signal (d) designates a signal obtained when the blip is properly detected, and signal d'' designating a signal due to big dirt. The signal generator 19 is driven by the leading edge of a signal from the high frequency eliminator 17 and generates a pulse signal (e) (waveform shown in FIG. 3(E)) somewhat shorter in time width than time $t_1$ for scanning one line (see a horizontal synchronizing signal of waveform shown in FIG. 3(B)). This pulse signal is transmitted to a pulse generator 21 through a line 20. The pulse generator 21 is driven by the trailing edge of a pulse signal (e) from the signal generator 19, and generates a pulse signal (f) (waveform shown in FIG. 3(F)) longer in time width than the signal (d) due to the blip of waveform shown in FIG. 3(D). Accordingly, this pulse signal (f) is generated with a time lag $t_1$ for one horizontal scanning period than the time when the signal (d) due to the blip is generated. The pulse signal (f) is transmitted to a gate 23 through a line 22. This gate 23 comprises for example an AND gate, and when signals (d and d'') (waveform shown in FIG. 3(D)) with signal short in time width eliminated are transmitted through the line 18 from the high frequency eliminator 17, these signals serve as gate signal and an output signal (g) (waveform shown in FIG. 3(G)) is generated from the gate 23. Thus, the error signal (d''), which had not been eliminated in the high frequency eliminator 17 and which is a cause of erroneous search due to the big dirt on the film, may be eliminated to obtain thereby a blip signal (g) of a constant time width due to the proper blip as an output signal of the gate 23. Since the microfilm F is moved in the range of scanning, the foregoing operation causes a plurality of blip signals (g) (see waveform shown in FIG. 3(G)) to be generated from the gate 23 while one blip passes the aforementioned range.

In the embodiment as described above, the direction of film movement is the same as that of scanning, and as a result, the phase of the blip signal (g) is displaced with respect to the fly-back line erasing signal and the horizontal synchronizing signal with waveforms shown in FIGS. (A) and (B), thus showing the relationship wherein the blip signal is successively shifted rightward with respect to the other signal. While the group of blip signals (g) have been generated during the time when one blip moves in the scanning range, one count signal may be formed from the group of blip signals and said count signal is counted for the purpose of frame searching.

Actually, the number of blip signals in this group of signals is in inverse proportion to the feed speed of film in such a way that from one blip, hundreds of blip signals are generated when the film feed speed is high while scores of thousands of blip signals are generated when the speed is low.

According to prior art searching devices, in order that a film may be stopped in position after the blip corresponding to the desired frame has been detected, such positioning to stop the film in position has been made through the relative positional relationship between the photoelectric converter element or slit and the blip on the film. However, the stop position may likely be displaced in terms of the accuracy of position where the photoelectric converter element or slit is provided, or of the mode of film. According to the present invention, the film may be stopped in position with remarkable accuracy as will be later described with reference to the embodiment.

Namely, in FIG. 1 there is provided a delay signal generator 26 (see waveform in FIG. 3 (H)) which generates a delay pulse signal after lapse of a predetermined delay time within time $t_1$ corresponding to a horizontal scanning period after a horizontal synchronizing signal (waveform in FIG. 3 (B)) has been received through the line 25 from the synchronizing signal generator 7. The delay signal generator 26 comprises a delay circuit, and delay time is determined by an input signal from the line 27, said generator having a period different from that of the horizontal synchronizing signal and transmitting a delay signal having time width longer than the signal. The delay signal from the delay signal generator 26 is transmitted to a gate 29 through a line 28. This gate 29 comprises for example an AND gate and receives a blip signal (g) from the line 24 and a delay pulse signal (h) from the line 28, and further provides a gate output signal (waveform in FIG. 3(I)) from a line 30 when both the blip signal and delay pulse signal are coincident. Since the phase of blip signal is changed in succession with respect to the delay pulse signal, the output signal of the gate 29 will have various pulse width. This gate output signal is transmitted through the line 30 to a high frequency eliminator 31 whose function is similar to that of the aforementioned high frequency eliminator 17, and in the eliminator 31, a signal (i') having a pulse width shorter than time width thus determined is eliminated to thus provide a signal (i) having a pulse width equal to or longer than the determined time width as an output signal (waveform in FIG. 3 ($J_1$)). This output signal is in the form of a signal partly selected from a group of gate output signals (waveform in FIG. 3 (I)). The number of signals thus selected is in proportion to the scanning speed while in inverse proportion to the film feed speed. Time for selecting gate output signals in the period of scanning is determined by a delay time of the delay pulse signal (h) to the horizontal synchronizing signal.

A mechanism adapted to form a count signal from a plurality of signals which emerge from the high frequency eliminator 31 during the time when one blip moves in the range of scanning will now be described. While it has been described in connection with waveforms in previous embodiments that the film feed speed is one tenth or less of the scanning speed for the purpose of better understanding, the speed has in fact a considerable difference, and the scanning speed is higher than the other. Accordingly, the number of signals which emerge from the high frequency eliminator 31 will be several to scores of signals when the film feed speed is at a high rate, and several hundred to several thousand at a low rate. Thus, actually approximating $J_1$ waveform in FIG. 3 (where time axis of A – $J_1$ waveforms is $(t)$), a number of pulse signals emerge from the high frequency eliminator 31 as shown in $J_2$ waveform (where time axis is $(t')$) in FIG. 3 when one blip is scanned. Then, frame searching may be carried out by counting pulse signals initially generated out of those signals as obtained from the eliminator, but there is a risk of lacking in pulse signals due to the problem of stability of electric circuits or film feed mechanism, causing an erroneous searching to be occurred. In the device of the present invention, therefore, an output signal from the high frequency eliminator 31 is transmitted to an integration circuit 33, which is charged when received the signal from the high frequency eliminator 21 and is discharged when no signal received. The integration circuit 33 has a difference in time of charge and discharge and is so designed that the charging speed is quick while the discharging speed is slow in a way that when signal is transmitted from the line 32, charging is effected with a quick time constant, and on the other hand, when no signal is transmitted, discharging is effected with a slow time constant. The signal (waveform in FIG. 3 (K)) generated by the integration circuit 33 is supplied to an amplifier 35, which amplifies only input signal in excess of a certain threshold, through a line 34. The amplifier 35 provides a signal $l_1$ (waveform in FIG. 3 ($L_1$)) obtained by amplifying and shaping the signal in excess of a set voltage (V) shown in the waveform in FIG. 3 (K), and this output signal is supplied as a count signal to an arithmetic unit 37 through a line 36. The arithmetic unit 37 has a counting circuit for counting the aforementioned signals and is supplied with a film frame number to be presearched prior to starting a film feed from an input means through a line 38. The frame number to be searched is compared with a frame number at start by a comparator incorporated in the arithmetic unit so as to judge the direction of film movement, and a drive control signal is transmitted to a drive controller 39 through a line 37'. Then, the feed mechanism 2 is driven to feed the film F, and the blip zone is successively scanned, by the operation as hereinbefore mentioned, as the film moves, and as a result, count signals successively emerge from the amplifier 35. The film is fed until the arithmetic unit 37 counts a predetermined number of frames. It is noted that the arithmetic unit 37 simultaneously provides a control signal for varying the film feed speed according to a degree of approximation of the frame number to be searched and the count value to vary the film feed speed thereby. In accordance with the operation as discussed above, one pulse signal (waveform in FIG. 3 ($L_1$)) may be obtain as a count signal to avoid an erroneous searching, even when several signals among a number of pulse signals (waveform in FIG. 3 ($J_2$)) from the high frequency eliminator 31 lack.

Figure 4:
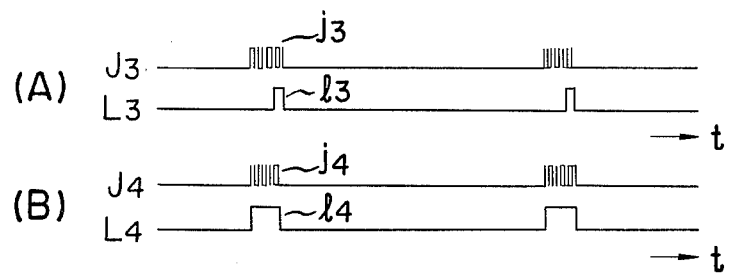
FIG. 4 shows waveforms exhibiting the relationship between a group of blip signals and count signals.

Further, time constant of the integration circuit 33 and threshold of the amplifier 35 are always constant so that time at which a count signal (waveform in FIG. 3 (L)) is generated is different with the film feed speed. As shown in FIG. 4 (A), in the event that the film is fed at a high speed, generation of the count signal $l_3$ presents a relatively great delay to generation of a group of pulse signals from the high frequency eliminator 31. On the other hand, as shown in FIG. 4 (B), in the event that the film is fed at a low speed, it may be considered that generation of the count signal $l_4$ substantially simultaneously concurs relatively to generation of a group of pulse signals $j_4$. This will give rise to no trouble in consideration of only the counting operation, whereas the above-described relative time difference will be a cause of decreasing the accuracy of stopping the film in position in consideration of time for stopping the film after searched. In practice, however, the film speed immediately before being stopped has been reduced in speed by means of a drive control signal from the arithmetic unit so that generation time of the count signal to the group of pulse signals immediately before the film being stopped is constant.

The operation of stopping the film will now be described. When the result of counting by the arithmetic unit indicates that the frame number to be searched is theoretically coincident with the count value, film stopping instructions are given to stop feeding the film thereby. Whereupon, the desired blip is detected and then the film is stopped with a delay corresponding to the delay time determined by the delay signal generator 26.

However, in practice, film feeding is mechanically accomplished, and the mechanical delay derived therefrom results in considerable time delay from the time at which stopping instructions are given to the time at which film is completely stopped.

Waveforms $L_2 - M_2$ in FIG. 3 (where time axis is $(t)$) are shown indicative of the delay operation as described above. In describing, the count signal $l_1$ is reduced to the count signal $l_2$ in order to coincide the time axis $t'$ of the count signal waveform $L_1$ shown in actual approximation with the time axis $(t)$ of the waveforms A – L. That is, it is assumed that the count signal $l_2$ has been obtained from the signal of waveform $J_1$.

Assuming now that the count signal $l_2$ is generated and the arithmetic unit 37 counted thereof theoretically coincides therewith, and film stopping instructions are given simultaneously with the generation of the count signal $l_2$, the film is completely stopped after the lapse of a mechanical delay time $t_2$. The waveform in FIG. 3 ($M_1$) shows a film feeding state wherein the film is stopped when logic value is 1. In the embodiment as just described, the film feed direction is the same as that of the scanning. In this case, when the film is completely stopped in time $t_2$ after the count signal $l_2$ has been generated, the blip (1b) on the film stops in a position as indicated in the figure with respect to the scanning line (a) in FIG. 5 (A), as is evident from the phase relationship between the fly-back line erasing signal (waveform in FIG. 3 (A)) and the output signal (waveform in FIG. 3 (C)) of the photoelectric converter 14.

The following is the case where the film feed direction is opposite to that of the scanning, which is converse to the former case. The signal waveforms in this case will now be described with reference to waveforms C' to N' corresponding to waveforms C to N. Supposing that film stopping instructions are given from are arithmetic unit 37 simultaneously with the generation of count signal $l'_2$ (waveform in FIG. 3 ($L'_2$)), the film is completely stopped after the lapse of a delay time $t_2$ (waveform in FIG. 3 ($M'_1$)). The blip $1b$ on the film is stopped in a position as indicated in the figure with respect to the scanning line ($a$) in FIG. 5 (B) in terms of the phase relationship between the fly-back line erasing signal and the output signal of the photoelectric converter (wavefrom in FIG. 3 ($C'$)). From this reason, it will be understood that the film stop position is relatively different according to the relationship between the film feed direction and the searching direction.

In order to eliminate the difference in stop position, the present invention provides, as shown in FIG. 1, a delay unit 40 which receives a count signal $l_2$ (waveform in FIG. 3 ($L_2$)) from the amplifier 35 through a line 36. The delay unit 40 comprises for example a delay circuit, a monostable circuit, etc. and is driven by the input of the count signal to generate a delay signal ($n$) or ($n'$) (waveforms in FIG. 3 (N or N')) after the lapse of a determined delay time. Further, the delay unit 40 receives a signal indicative of the film feed direction from the arithmetic unit 37 through a line 41 and changes the delay time of the delay unit by switching the film feed direction properly or reversely. Namely, it is so determined that delay time $t_3$ is employed for the proper feed and delay time $t_3$ is employed for the reverse feed.

In FIG. 1, the delay signal in the delay unit 40 is transmitted to a gate 43, which comprises for example an AND gate, through a line 42. After a predetermined number of count signals have been counted, the arithmetic unit 37 provides a control signal through a line 44. This control signal enters the gate 43 to allow the delay signal to enter the gate 43. Then, the gate 43 generates a film stopping instruction signal at the trailing edge of the delay signal. This stopping instruction signal is transmitted to the drive controller 39 through a line 45 thereby completely stopping the film after the lapse of a mechanical delay.

The above-described operation will now be described with reference to waveforms of FIG. 3. In the case where the film feed direction is the same as that of the scanning, the delay unit 40 is driven by the count signal $l_2$ from the amplifier 35 and generates the delay signal ($n$) of the determined delay time $t_2$ by the signal indicative of the same direction sent from the arithmetic unit 37 through the line 41. Then, the film stopping instruction signal is produced from the gate 43 at the trailing edge of the delay signal ($n$) to completely stop the film after the lapse of the mechanical delay time $t_2$ followed by the stopping instruction (waveform in FIG. 3 ($M_2$)). On the other hand, in the case where the film feed direction is opposite to the scanning direction, the delay unit 40 is driven by the count signal $l'_2$ (waveform in FIG. 3 ($L'_2$)) from the amplifier 35 and generates the delay signal ($n'$) (waveform in FIG. 3 (N)) of the determined delay time $t_3$ by the signal indicative of the reverse direction sent from the arithmetic unit 37. Then, the film stopping instruction signal is generated from the gate 43 at the trailing edge of the delay signal ($n'$) to completely stop the film after the lapse of the mechanical delay time $t_2$ followed by the stopping instruction (waveform in FIG. 3 ($M'_2$)).

Figure 5:
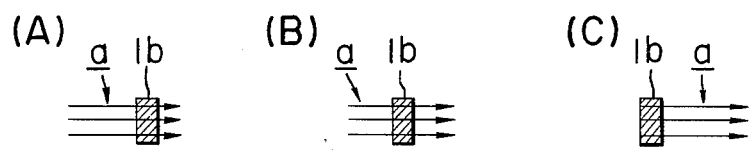
FIGS. 5 (A) – (C) are views exhibiting the relationship between scanning lines and the blip.

In either case, as is evident from the phase relationship between the fly-back line erasing signal and the blip signal, the blip $1b$ on the film in FIG. 5 (C) is stopped in a position as indicated in the figure with respect to the scanning line ($a$). In either case, accordingly, the positional relationship between the scanning line and blip is relatively constant. In FIG. 5 ($c$), the blip $1b$ is positioned and stopped at a start portion of the scanning of the scanning line ($a$). From the foregoing embodiments, it will be appreciated that the delay time of the delay unit may suitably be determined to correct the film stop position, whereby the film may always accurately stopped in position independently of the film feed direction.

In the device of the present invention, the blip corresponding to the desired image frame may be stopped within the range of the scanning in such a manner that when the arithmetic unit 37 controls time for generating a control signal indicative of theoretical coincidence thereof and counts a count signal formed by detection of blip corresponding to the desired image frame or frame in the vicinity thereof in terms of the positional relationship between the image frame and blip on the microfilm, time for generating the count signal in searching the blip zone, or requirements as to proper or reverse of the film feed direction, output of the stopping signal is made to the line 44 or the count value of the arithmetic unit is added or deducted by one prior to feeding the film. For example, in the preferred embodiment utilizing a film shown in FIG. 2, in the case where ithe scanning direction is the same as the film feed direction, the blip stopped within the range of the scanning corresponds to an image frame next to the desired image frame, as shown in FIG. 5 (C), while in the case where the scanning direction is opposite to the film feed direction, the blip stopped within the range of the scanning shown in FIG. 5 (C) corresponds to the desired image frame. Accordingly, in the case where the scanning direction is the same as the film feed direction, the count value of the arithmetic unit 37 is deducted by one prior to feeding the film. Thereafter, the film is fed and counting based on detection of the blip is effected. Actually, the blip placed forwardly by one frame of the blip corresponding to the desired image frame is selected to be stopped, whereby the blip corresponding to the desired image frame is selected to be stopped, whereby the blip corresponding to the desired image frame may properly be stopped in position.

Figure 7:
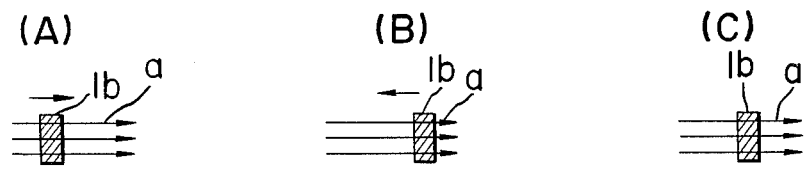
FIGS. 7 (A) – (C) are views exhibiting the relationship between scanning lines and the blip.

The film stopping operation will now be described by way of another preferred embodiment. It is assumed that in FIG. 1, the film F is inched by means of an inching feed mechanism 2' which is driven and controlled by means of a second drive controller 50. The inching feed mechanism 2' comprises for example a pulse motor. Unlike the embodiment previously mentioned, wherein after the desired frame number has been counted, the film position is corrected to stop the film, this specific embodiment provides an arrangement wherein the stop position is not corrected after the desired frame number has been counted, but the film is once stopped in a suitable position with a mechanical delay, and the stop position is corrected by way of operation later described whereby the desired frame may properly be positioned in a predetermined reference position. FIGS. 7 (A) and (B) show the relative positional relationship between the scanning line and the blip on the film in the case where the film is stopped without correcting the film stop position after the desired frame number has been counted. Assuming now that a predetermined reference position in which the film is stopped is determined to be a position in which a predetermined blip is disposed in the mid-portion of the scanning line as shown in FIG. 7 (C), the predetermined blip (1b) is positioned, in FIG. 7 (A), on the left hand relative to the reference position, while the blip (1b) is positioned, in FIG. 7 (B), on the right hand relative to the reference position. In either case, the blip on the film is positioned different from the scanning line (a), and the film is so stopped.

Figure 12:
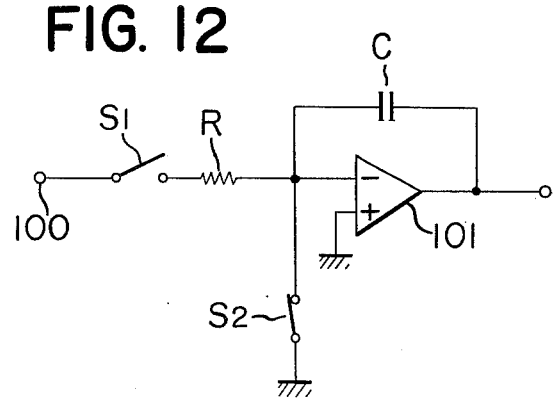
FIG. 12 is a circuit diagram of one preferred form of a time width - level conversion portion.

According to the present invention, as is apparent from the above, after the film has once been stopped, the film is displaced to occupy a predetermined reference position so that it may properly be positioned. That is to say, in FIG. 1 there is provided a pulse signal generator 52 which is triggered and set by the trailing edge of a horizontal synchronizing signal (waveform A in FIG. 6 (A)) sent from the synchronizing signal generator 7 through the line 25 and which is reset by an input signal sent from the line 51. The generator 52 comprises for example a flip-flop circuit and has its pulse signal (waveform B in FIG. 6 (A)), the set output, transmitted to a reset terminal of a flip-flop circuit 54 through a line 53. The period of the pulse signal is determined by the input signal from the line 51 and generates in period shorter than that of the horizontal scanning. In the illustrated embodiment, the period is determined so as to be one half of the phase of the horizontal synchronizing signal. That is, the predetermined blip 1b is positioned in the mid-portion of the scanning line (a) as shown in FIG. 7 (C). The flip-flop circuit 54 is reset by the trailing edge of the pulse signal and is set by the leading edge of the flip-flop signal (waveform C in FIG. 6 (A)) sent from the gate 23 through the line 24. The set output signal (waveform D in FIG. 6 (A)) and the reset output signal of the flip-flop circuit 54 are transmitted to a signal change-over unit 57 through lines 55 and 56, respectively. The signal change-over unit 57 transmits either of the set output signal or the reset output signal of the flip-flop circuit 54 to a pulse width-level converter 59 through a line 58 by a change-over signal (waveform G in FIG. 6 (A)) from a direction discriminator 63. The converter 59 comprises for example, as shown in FIG. 12, a switch $S_1$ to be closed when a terminal 100 receives a signal, a switch $S_2$ to be opened when the switch $S_1$ is closed, a capacitor C a resistor R, and an arithmetic amplifier 101, and serves to convert the input signal into a signal whose voltage level is varied with the pulse width thereof. On the other hand, the direction discriminator 63 comprises for example an AND gate circuit, and receives an inverted signal of the horizontal synchronizing signal and a set output signal of the flip-flop circuit 54 to discriminate the logic value of the inverted horizontal synchronizing signal and the logic value of the set output signal, both the logic values being compared to thereby provide a change over signal. This change-over signal is transmitted to the signal change-over unit 57 to supply either of output signals in the flip-flop circuit to the pulse width-level converter 59 and is transmitted to the second drive controller 50 to regulate the film feed direction.

Figure 6A:
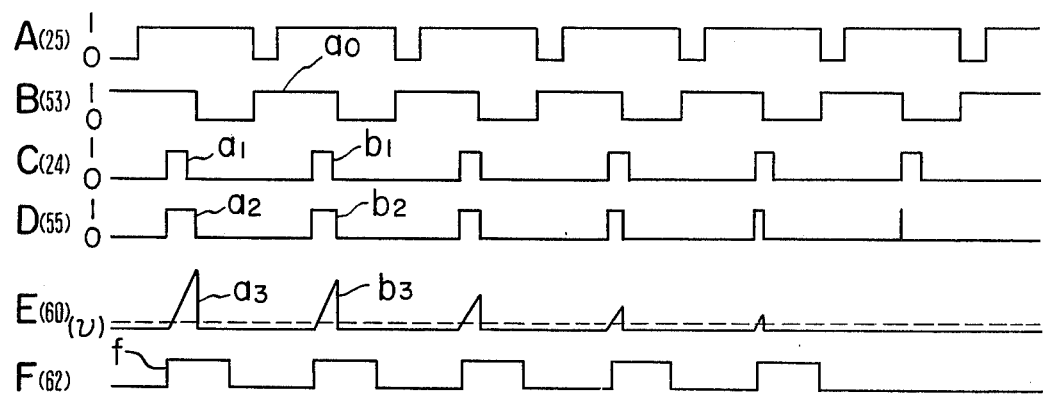
FIGS. 6 (A) and (B) show another signal waveforms on conductors in the searching device of FIG. 1.
Figure 6B:
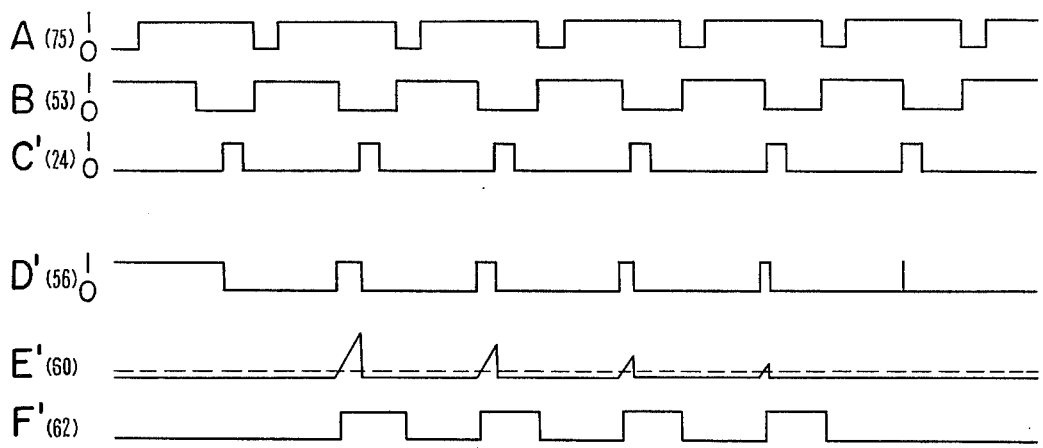

A conversion signal (waveform E in FIG. 6 (A)) of the pulse width-level converter 59 is transmitted to an amplifier 61 which provides a pulse signal having a predetermined pulse width when receives a signal in excess of a certain threshold through a line 60. The output signal (waveform F in FIG. 6 (A)) of the amplifier 61 is transmitted to the second drive controller 50 through a line 62. Accordingly, the film is inched to the frame regulated by the change-over signal through the inching film feed mechanism 2' every time when the pulse signal from the amplifier 61 is supplied to the drive controller 50 after the film feeding has been stopped, and such inching is performed until the pulse signal from the amplifier 61 is gone, that is, until the film is displaced in position. Therefore, assuming that as a result of frame searching, the film is once stopped in a position wherein a blip signal ($a_1$) is generated relative to the horizontal synchronizing signal (the situation being shown in FIG. 7 (A)), in waveform C in FIG. 6 (A), the flip-flop circuit 54 generates an output signal ($a_2$) having a pulse width corresponding to a phase displacement between the blip signal and the width pulse signal as shown in waveform D in FIG. 6 (A) through the input of a flip-flop signal $a_1$ of the flip-flop circuit 54 and a pulse signal $a_0$ having a determined pulse width sent from the pulse signal generator 52. The direction discriminator 63 generates a change-over signal indicative of left feed due to the inconsistency between the logic value of the inverted horizontal synchronizing signal and the logic value of the set output signal of the flip-flop circuit 54, the change-over signal changing-over the mode of feed of the second drive controller 50 to left feed and changing-over so that the signal change-over unit 57 may allow the output of the line 55 to be passed. The set output signal $a_2$ of the flip-flop circuit is transmitted to the pulse width-level converter 59 through the signal change-over unit 57 and is converted into a signal $a_3$ as indicated in the waveform E in FIG. 6 (A) according to the pulse width of the signal. When the conversion signal $a_3$ has its voltage level in excess of a predetermined voltage ($v$) of the amplifier 61, the amplifier 61 imparts a drive pulse signal ($f$) to the second drive controller 50. Thus, the film is inched leftward in FIG. 7 (A), and then a blip signal $b_1$ (waveform in FIG. 6 (C)) is generated by scanning the scanning light spot. Because of the phase displacement between the blip signal $b_1$ and the width pulse signal caused by the inching feedoof film, a signal $b_2$ (waveform in FIG. 6 (D)) having a pulse width shorter than that of the signal $a_2$ previously generated is generated from the flip-flop circuit 54, and the operation similar to that hereinabove described is carried out. When the film is gradually displaced from its original stop position to left by repeating these operations several times, the pulse width of the signal generated from the flip-flop circuit 54 gradually becomes shorter due to the phase displacement previously mentioned, and the voltage level of the output signal of the pulse width-level converter 59 decreases accordingly. In this case, if the voltage level of the output signal is in excess of the predetermined voltage ($v'$), the amplifier 61 provides the drive pulse signal ($f$) to effect the film feeding, whereas if it is below the predetermined voltage, the amplifier 61 will not provide the drive pulse signal to completely stop moving the film. At this time, the film is stopped in a position as indicated in FIG. 7 (C) in terms of the phase relationship between the horizontal synchronizing signal and the blip signal in FIG. 6 (A). This stop position of the film may suitably be changed by the signal sent through the line 51.

It is now assumed that as a result of frame searching, the film is once stopped in a position as indicated in FIG. 7 (B). In this case, the logic value of the inverted horizontal synchronizing signal sent through the line 25 is coincident with the logic value of the set output signal of the flip-flop circuit 54, and therefore the discriminator 63 provides a signal for feeding a film in the direction opposite to that previously described and the signal change-over unit 57 provides a signal so that the output of the line 56 may be passed.

This change-over signal is transmitted to the direction change-over unit 57 through the line 64, and the direction change-over unit 57 selects the reset output signals of the flip-flop circuit 54 and transmits it to the pulse width-level converter 59. The operation to be performed in this case can be understood in consideration of waveforms C' – G' in FIG. 6 (B) corresponding to waveforms C – G in FIG. 6 (A) similarly to the above. Consequently, the stop position of the film after displaced is as shown in FIG. 7 (C). In either case, therefore, it will be understood that the film has been corrected to occupy the same position as a position where the blip is in the mid-portion of the scanning range.

In accordance with the present invention, the stop position of the film is always detected and corrected by comparing it with the reference position determined by the input signal from the line 51, whereby the film may be positioned at a predetermined position with remarkable accuracy. Moreover, for the purpose of correcting stop position of the film use of the foregoing embodiments may be made in the form of a single arrangement or a combined arrangement.

The film stopping position in the aforementioned first embodiment is determined by two methods, one method of which is to change a phase of a delay pulse signal generated by the delay signal generator 26 shown in FIG. 1, and the other method of which is to change delay time of the delay unit 40. Describing the second method in detail, assume that the distance between adjacent blips is $T_0$ (see FIG. 2); the film advances by $T_3$ at delay time $t_3$ of the delay unit 40 in the case where the film feed direction is the same as that of the scanning and the film advances by $T_3$ at delay time $t'_3$ of the delay unit in the case where the film feed direction is opposite thereto; and the film advances by $T_2$ at mechanical delay time $t_2$ from the time of stopping instructions to the time when the film is completely stopped, the relationship between them is given by the equation:

$$T_0 = 2T_2 + T_3 + T'_3$$

If the delay time $t_3$ and $t'_3$ are determined so as to meet the relationship expressed in the equation, the stopping position of the blip on the film may suitably be changed. In equation, $T_0$ is the distance between adjacent blips (FIG. 2). It will be also noted that various forms of film different in position of placement of the blip relative to the image frame of film, for example, the film shown in FIGS. 8 (A) to (C) may suitably be stopped in position.

Figure 8:
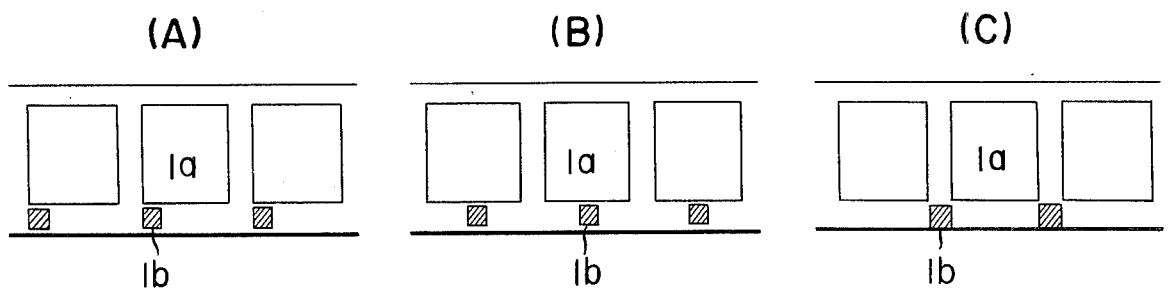
FIGS. 8 (A) – (C) are front views showing various forms of film with the blip position changed.
Figure 9:
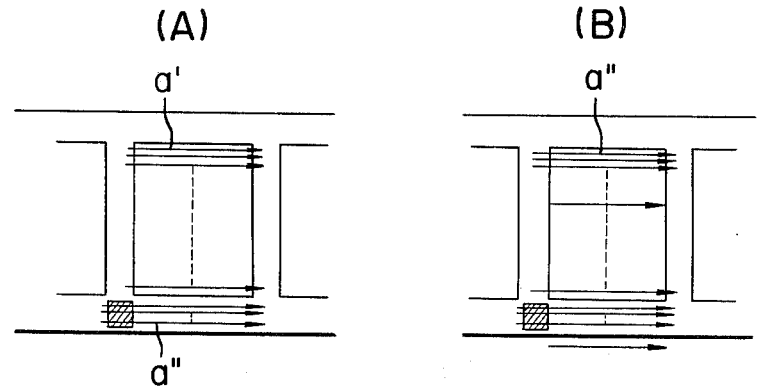
FIGS. 9 (A) and (B) are views of assistance in explaining the relationship between the microfilm and scanning lines.

In the case where the blip on the film is placed between adjacent image frames as seen in FIG. 8 (C), the scanning range of the scanning light spot is extended as shown in FIGS. 9 (A) and (B). Also, the image zone may be scanned by the scanning line 9(a') shorter than the scanning line (a'') of the blip zone as shown in FIG. 9 (A), or both the image frame and blip zone may be scanned by the same scanning line (a'') as shown in FIG. 9 (B).

Figure 10:
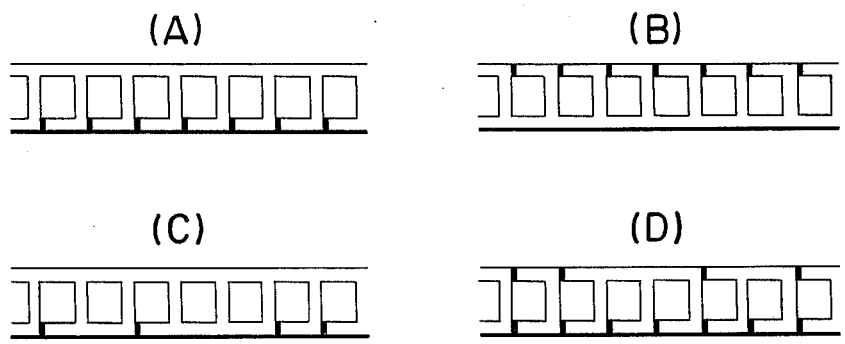
FIGS. 10 (A) – (D) are front views of other preferred forms of microfilm.
Figure 11:
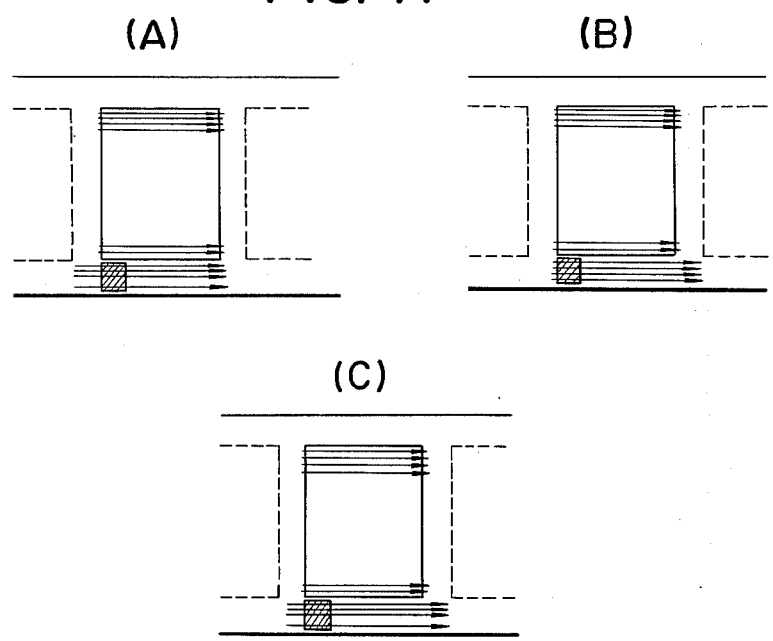
FIGS. 11 (A) – (C) are other views of assistance in explaining the relationship between the microfilm and scanning lines.

It will be noted that if the scanning range is too narrow, it is sometimes impossible to stop the film in a portion in the vicinity of mid-portion of the scanning range. To avoid this, the scanning range of the blip zone is extended as shown in FIGS. (A), (B) and (C). The present invention may also be applied to various forms of film, such as a roll of film with blips placed on one side of the film as shown in FIGS. 10(A) and (B), a roll of film with blips intermittently placed as shown in FIG. 10, and a roll of film with blips placed on opposite sides of the film as shown in FIG. 10 (D). In the case of using the film with blips intermittently placed as shown in FIG. (C), the scanning range is extended so that the blip corresponding to the predetermined image frame may be positioned and stopped within the range of the scanning range. While the image frame and blip are scanned by a scanning device in the illustrated embodiment, it may be so designed that the image frame is subjected to overall projection by means of a conventional stationary light source so as to be appeared on the screen, and the scanning device is provided to scan only the blip. The scanning device may comprise various well-known means such as a laser scanning device, light receiving elements, luminescent elements, and the like.

The device of the present invention can avoid an erronous detection caused by dirt or stain adhered to the film when in detection of blip, thus providing an accurate frame searching. Moreover, in accordance with the device of the invention, the roll of film may always accurately be stopped in position even in the searching with the use of various forms of film different in the relative positional relationship between the image frame and the blip on the film. Furthermore, in accordance with the device of the invention, the stopping position of film in the same form may suitably be controlled with the stopping position being given an extensive flexibility. The invention further provides a high speed searching.

We claim:

1. An arrangement for searching a desired frame, or frames, of an image on a film having marks associated with the frames comprising:
    means for feeding the film;
    means for repeatedly scanning, at a constant repetition rate, a scanned area which the film runs through, to detect the mark, said scanning means being adapted to scan the mark a plurality of times to produce, in each scanning, a detection signal when detecting the mark, so that a plurality of the detection signals associated with the mark are produced while the scanned area contains the mark;
    means operative in response to the detection signals for making, from the plurality of detection signals, a mark signal which is for use in identifying the marks that have passed through the scanned area; and
    means operative in response to the mark signals for controlling the feeding of the film when receiving the mark signal associated with a desired frame, or frames, of an image on the film.

2. An arrangement in accordance with claim 1, wherein said means for making the mark signals comprises, means for generating pulses at a constant repetition rate, a logic circuit receiving the detection signals and said pulses to produce outputs, and a circuit to be electrically charged in response to the outputs from the logic circuit, whereby the mark signal will be produced when said circuit is charged over a predetermined level.

3. An arrangement in accordance with claim 2, wherein the scanning of said scanning means is controlled by said pulses.

4. An arrangement in accordance with claim 2, wherein said means for generating the pulses comprises a pulse oscillator for generating said pulses, and a delay circuit operative in response to the pulses for producing an output signal when a predetermined delay time has passed after the pulse has been received.

5. An arrangement in accordance with claim 1, further comprising means for eliminating the detection signal having its duration different from a predetermined duration in length.

6. An arrangement in accordance with claim 1, wherein said scanning means comprises a light source and an image pickup tube.

7. An arrangement in accordance with claim 1, wherein said scanning means comprises an energy beam source for providing energy beams, means for deflecting the energy beam so as to repeatedly scan the scanned area with the energy beam, and photoelectric conversion means operative in response to the energy beam.

8. An arrangement in accordance with claim 7, wherein said beam source comprises a cathode-ray tube.

9. An arrangement in accordance with claim 7, wherein said beam source comprises a laser oscillator.

10. An arrangement in accordance with claim 1, wherein the scanning directions of said scanning means are parallel with respect to the film running direction.

11. An arrangement in accordance with claim 7, which is adapted to scan the image recorded portion and the mark portion of the film with the beam.

12. An arrangement in accordance with claim 1, wherein said means for controlling the feeding of the film comprises means for counting said mark signals, and means for stopping the feeding of the film when the count in said counting means reaches a desired value.

13. An arrangement in accordance with claim 1, wherein said means for controlling the feeding of the film further comprises, means operative in response to the mark signals for positioning a frame, or frames, of an image on the film at a desired position.

14. An arrangement in accordance with claim 13, wherein said positioning means comprises, means for producing a control signal for causing the film to stop when a predetermined delay time has passed after the mark signal has been received.

15. An arrangement in accordance with claim 14, wherein the delay time of said means for producing the control signal is set so as to differ depending upon the film running direction.

16. An arrangement in accordance with claim 14, wherein said control means further comprises, means for counting the mark signals, and means for cutting-off said control signal before the count in said counting means reaches a desired value.

17. An arrangement in accordance with claim 14, which is further adapted to control the position at which a desired frame, or frames, on the film is to stop, by adjusting said delay time.

18. An arrangement in accordance with claim 15, wherein said delay time is decided in such a manner that the value of $2T_2 + T_3 + T_3'$ is equal to the distance between two adjacent marks on the film, where $T_2$ is the distance which the film has run since the time an instruction to stop the film running was provided until the time the film stops completely, and $T_3$ and $T_3'$ are distances which the film runs during periods $t_3$ and $t_3'$, respectively, where $t_3$ is said delay time provided when the film is fed in the same direction as the scanning direction and $t_3'$ is said delay time provided when the film is fed in the direction opposite to the scanning direction.

19. An arrangement in accordance with claim 1, further comprising means for positioning a frame, or frames, of an image on the film at a desired position after the film has once stopped.

20. An arrangement in accordance with claim 19, wherein said positioning means comprises means for generating pulses at a constant repetition rate, and means operative in response to said pulses and the detection signals for shifting the film so that the mark on the film is located at a desired position.

21. An arrangement in accordance with claim 20, wherein said shifting means comprises means for producing a control signal with its duration corresponding to the phase difference between said pulse and the detection signal, and means for feeding the film by a given length when a control signal, having its duration longer than a predetermined length, has been received.

22. An arrangement in accordance with claim 21, wherein said means for feeding the film by a given length comprises means for producing a driving signal with its voltage level corresponding to the duration of said control signal, and a pulse motor operative when receiving a driving signal having its voltage level higher than a predetermined level, thereby to stop the pulse motor when the mark on the film is located at a desired positions.

23. An arrangement in accordance with claim 19, further comprising, means for selecting a direction to which the film is to be fed, depending upon which direction a displacement occurs between the mark on the film and the desired position when the film stops.

24. An arrangement in accordance with claim 20, wherein the pulse repetition rates of said pulses are adapted to be changeable so as to be adjustable to the desired position at which the mark on the film is to be stopped.

25. An arrangement for detecting a mark on a running film comprising:
  means for repeatedly scanning, at a constant repetition rate, a scanned area through which the film runs, to detect the mark, said scanning means being adapted to scan the mark a plurality of times to produce, in each scanning, a detection signal when detecting the mark, so that a plurality of detection signals associated with the mark are produced while the scanned area contains the mark;
  means for generating pulses at a constant repetition rate;
  logical means for receiving the detection signals and said pulses to produce outputs; and
  means operative in response to the outputs from said logical means for making a mark signal from the plurality of the detection signals.

26. An arrangement for searching a desired frame, or frames, of an image on a film comprising:
  means for feeding the film;
  means for repeatedly scanning, at a constant repetition rate, a scanned area through which the film runs, to detect the mark, said scanning means being adapted to scan the mark a plurality of times to produce, in each scanning, a detection signal when detecting the mark, so that a plurality of detection signals are produced while the scanned area contains one of the marks;

means for generating pulses at a constant repetition rate;

logical means for receiving the detection signals and said pulses to produce outputs;

means operative in response to the outputs from said logical means for making a mark signal from the plurality of the detection signals;

means for counting the mark signals; and means for controlling the feeding of the film when the count in said counting means reaches a desired value.

27. An arrangement for searching a desired frame, or frames, of an image on a film comprising:

means for feeding the film into a scanned area;

means for applying energy beams to the scanned area;

means for deflecting the energy beams so as to scan the scanned area a plurality of times while the scanned area contains one of the marks on the film;

means for receiving the energy beams impinging on the film to detect the mark to produce a plurality of detection signals while the scanned area contains one of the marks;

means for making a mark signal from the plurality of detection signals; and means operative in response to the mark signals for controlling the feeding of the film when receiving the mark signal associated with a desired frame, or frames, of an image on the film.

28. A mark searching arrangement comprising:

means for transferring marks recorded on a surface;

means for repeatedly scanning, at a constant repetition rate, a scanned area which the marks pass through, to detect the mark, said scanning means being adapted to scan the mark a plurality of times to produce, in each scanning, a detection signal when detecting the mark, so that a plurality of detection signals are produced while the scanned area contains one of the marks;

means for generating pulses at a constant repetition rate;

means for producing a signal having its duration corresponding to a phase difference between the detection signal and said pulse; and means operative, in response to said signals having the duration thereof corresponding to the phase difference, for producing a mark signal, whereby there is provided a mark signal, associated with the mark while the scanned area contains the mark.

29. An arrangement in accordance with claim 27, wherein said means for controlling the feeding of the film further comprises, means operative in response to the mark signals for positioning a frame, or frames, of an image on the film at a desired position.

30. An arrangement in accordance with claim 27, further comprising, means for positioning a frame, or frames, of an image on the film at a desired position after the film has once stopped.

* * * * *

UNITED STATES PATENT AND TRADEMARK OFFICE
CERTIFICATE OF CORRECTION

PATENT NO. : 3,963,937
DATED : June 15, 1976
INVENTOR(S) : MUTSUHIRO INOUE, et al.

It is certified that error appears in the above-identified patent and that said Letters Patent are hereby corrected as shown below:

Column 1, line 18, change "film" (second occurrence), to -- frame --;   line 52, after "film", insert -- stop --.
Column 2, line 4, change "applicalbe" to -- applicable --.
Column 4, line 4, change "if" to -- it --;   line 48, change "1" to -- "l" --;   line 51, change "O" (first occurrence) to -- "0" --.
Column 5, line 19, change "excess or" to -- excess of --.
Column 7, line 24, change "21" to -- 31 --.
Column 8, line 42, change "/₂" to -- $\ell_2$ --;   line 44, change "theorecti-" to -- theoreti- --;   line 50, change "1", to -- "l" --.
Column 9, line 53, change "$\ell'_2$" to -- $\ell_2$ --.
Column 11, line 62, after "when" insert -- it --.
Column 12, line 38, change "feedoof" to -- feed of --.
Column 13, line 23, after "film", insert a -- , --.
Column 16, line 30, change "positions" to -- position --.

Signed and Sealed this

Twenty-sixth Day of October 1976

[SEAL]

Attest:

RUTH C. MASON
Attesting Officer

C. MARSHALL DANN
Commissioner of Patents and Trademarks